(12) United States Patent
Tang

(10) Patent No.: US 11,395,255 B2
(45) Date of Patent: Jul. 19, 2022

(54) PAGING METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/915,781

(22) Filed: Jun. 29, 2020

(65) Prior Publication Data

US 2020/0329454 A1 Oct. 15, 2020

Related U.S. Application Data

(63) Continuation of application No. PCT/CN2017/120196, filed on Dec. 29, 2017.

(51) Int. Cl.
*H04W 68/00* (2009.01)
*H04W 16/14* (2009.01)
*H04W 24/08* (2009.01)
*H04W 68/02* (2009.01)
*H04W 72/04* (2009.01)

(52) U.S. Cl.
CPC ........ *H04W 68/005* (2013.01); *H04W 16/14* (2013.01); *H04W 24/08* (2013.01); *H04W 68/025* (2013.01); *H04W 72/0453* (2013.01)

(58) Field of Classification Search
CPC ... H04W 68/005; H04W 16/14; H04W 24/08; H04W 68/025; H04W 72/0453; H04W 68/02; H04W 72/0446; H04W 74/0808; H04W 72/042
See application file for complete search history.

(56) References Cited

U.S. PATENT DOCUMENTS

2015/0031382 A1 1/2015 Damnjanovic et al.
2016/0057731 A1* 2/2016 Damnjanovic ... H04W 72/0453
455/458

(Continued)

FOREIGN PATENT DOCUMENTS

CN 105992345 A 10/2016
CN 106576325 A 4/2017
CN 107071903 A 8/2017

(Continued)

OTHER PUBLICATIONS

Guangdong OPPO Mobile Telecommunications Corp. Ltd., Extended European Search Report, EP17936630.7, Oct. 22, 2020, 7 pgs.

(Continued)

*Primary Examiner* — Said M Elnoubi
(74) *Attorney, Agent, or Firm* — Morgan, Lewis & Bockius LLP

(57) ABSTRACT

Disclosed in the present application are a paging method, a network device and a terminal device. The method includes: determining, by a network device, a paging window for performing paging for a terminal device, wherein the paging comprises S candidate paging occasions (POs), and S is a positive integer greater than 1; and monitoring, by the network device, whether a carrier in an unlicensed frequency band is idle based on the paging window.

20 Claims, 3 Drawing Sheets

300

Determine, by a terminal device, a paging window for a network device to page a terminal device, the paging window including S candidate paging occasions (POs) — 310

Monitor, by the terminal device, a paging message sent from the network device at the paging window — 320

(56) References Cited

U.S. PATENT DOCUMENTS

2017/0303236 A1* 10/2017 Sun ................ H04W 76/28
2018/0199308 A1* 7/2018 Liu ................ H04L 5/0048

FOREIGN PATENT DOCUMENTS

| WO | WO2016163545 A1 | 10/2016 | | |
|---|---|---|---|---|
| WO | WO2017027807 A2 | 2/2017 | | |
| WO | WO2017/145120 A1 | 8/2017 | | |
| WO | WO-2017145120 A1 * | 8/2017 | .......... | H04W 68/005 |
| WO | WO2017/211682 A1 | 12/2017 | | |
| WO | WO-2017211682 A1 * | 12/2017 | ........ | H04W 74/0808 |

OTHER PUBLICATIONS

Guangdong OPPO Mobile Telecommunications Corp. Ltd., International Search Report and Written Opinion, PCT/CN2017/120196, dated Sep. 27, 2018, 8 pgs.
Ericsson, Future compatibility for operating NR in unlicensed spectrum, 3GPP TSG-RAN WG2 #95bis, Tdoc R2-166819, Kaohsiung, Taiwan, Oct. 10-14, 2016, 5 pgs.
Guangdong OPPO Mobile Telecommunications Corp. Ltd., Notification of Reasons for Refusal, JP2020536050, dated Nov. 9, 2021, 8 pgs.
Guangdong OPPO Mobile Telecommunications Corp. Ltd., Notification of Reason for Refusal, KR1020207021901, dated Sep. 30, 2021, 13 pgs.
Huawei, HiSilicon, NR Standalone Operation on unlicensed Bands, 3GPP TSG RAN WG Meeting #90, R1-1713786, Prague, Czech Republic, Aug. 21-25, 2017, 4 pgs.
Nokia, Nokia Shanghai Bell, Paging in NR, 3GPP TSG-RAN WG1 meeting #91, R1-1720883, Reno, Nevada, USA, Nov. 27-Dec. 1, 2017, 7 pgs.
Softbank, Avoiding the impact on MME, 3GPP TSG RAN WG1 Meeting #91, Rl-1720565, Reno, Nevada, USA, Nov. 27-Dec. 1, 2017, 4 pgs.
OPPO, On NR paging design, 3GPP TSG RAN WG1 Meeting #91, R1-1720001, Reno, NV, USA, Nov. 27-Dec. 1, 2017, 4 pgs.
Guangdong OPPO Mobile Telecommunications Corp. Ltd., Examination Report, IN202017028092, dated Jul. 13, 2021, 6 pgs.
Guangdong OPPO Mobile Telecommunications Corp. Ltd., Communication Pursuant to Article 94(3), EP17936630.7, dated Mar. 4, 2022, 6 pgs.
Guangdong OPPO Mobile Telecommunications Corp. Ltd., Invitation to Respond to Written Opinion, SG11202006278U, dated Feb. 23, 2022, 8 pgs.

* cited by examiner

200

Determine, by a network device, a paging window for performing Paging for a terminal device, the paging window including S candidate paging occasions (POs) — 210

Monitor, by the network device, whether a carrier in an unlicensed frequency band is idle based on the paging window — 220

PAGING METHOD, NETWORK DEVICE AND TERMINAL DEVICE

CROSS-REFERENCE TO RELATED APPLICATION

This application is a continuation of PCT Application No. PCT/CN2017/120196, entitled "PAGING METHOD, NETWORK DEVICE AND TERMINAL DEVICE" filed Dec. 29, 2017, which is incorporated herein by reference in its entirety.

TECHNICAL FIELD

Embodiments of the present disclosure generally relate to wireless communication technologies, and more particularly, to methods for paging, network devices and terminal devices.

BACKGROUND

For a communication system working in an unlicensed frequency band, a sending end needs to use a Listen Before Talk (LBT) method to determine whether the channel is idle before sending a signal, and only after determining that the channel is idle, the sending end can send a signal.

In a Long Term Evolution (LTE) system, paging messages are transmitted at a Paging Occasion (PO) in a Paging Frame (PF). In the New Radio (NR) system, for the transmission of paging messages in unlicensed frequency bands, if paging messages are still sent in this way, there is only one opportunity for sending the paging messages in a paging cycle, and if a network device does not preempt the channel before sending the paging messages, the paging messages can only be postponed until the network device successfully preempts the channel. This results in a large delay in sending the paging messages.

SUMMARY

Embodiments of the present disclosure provide methods for paging, network devices and terminal devices, which can reduce the delay in transmission of paging messages.

According to a first aspect, there is provided a method for paging, including:

determining, by a network device, a paging window for performing paging for a terminal device, wherein the paging window includes S candidate paging occasions (POs), and S is a positive integer greater than 1; and monitoring, by the network device, whether a carrier in an unlicensed frequency band is idle based on the paging window.

According to an exemplary embodiment, the network device performs paging for the terminal device at a PO in the paging window according to a monitoring result.

In embodiments of the present disclosure, when the network device and the terminal device listen in the unlicensed frequency band, they not only listen at one PO, but listen in a paging window. Thus, there are multiple opportunities for the network device to send paging messages in one paging cycle. Accordingly, when paging in the unlicensed frequency band, the delay in sending paging messages can be greatly reduced.

According to an exemplary embodiment, determining, by a network device, a paging window for performing paging for a terminal device includes:

determining, by the network device, among a reference paging frame (PF) for performing paging for the terminal device, a reference PO; and determining, by the network device, the reference PO, $M_1$ POs ahead of the reference PO and/or $M_2$ POs after the reference PO, as the paging window, where $M_1$ and $M_2$ are positive integers.

According to an exemplary embodiment, an index of the reference PO is $i\_s = (\lfloor \text{UE-ID mod N} \rfloor) \mod Ns$, wherein UE-ID is a device identity of the terminal device, N is an amount of PFs available for paging in one paging cycle, Ns is an amount of POs included in one PF, and $\lfloor \ \rfloor$ means rounding down.

According to an exemplary embodiment, determining, by a network device, a paging window for performing paging for a terminal device, includes:

selecting, by the network device, S POs in at least one radio frame as the paging window, wherein the at least one radio frame includes a reference PF; or wherein the at least one radio frame includes the reference PF, $K_1$ radio frames ahead of the reference PF and/or $K_2$ radio frames after the reference PF, where $K_1$ and $K_2$ are positive integers.

According to an exemplary embodiment, the method further includes:

sending, by the network device, second indication information to the terminal device, wherein the second indication information is used to indicate positions of the S POs.

According to an exemplary embodiment, sending, by the network device, second indication information to the terminal device includes:

sending, by the network device, the second indication information through a carrier in a licensed frequency band.

According to an exemplary embodiment, sending, by the network device, second indication information to the terminal device includes:

sending, by the network device, the second indication information through a carrier in an unlicensed frequency band.

According to an exemplary embodiment, the second indication information is carried in a broadcast message or Radio Resource Control (RRC) signaling.

According to an exemplary embodiment, a System Frame Number (SFN) of the reference PF satisfies: SFN mod T=(T/N)×(UE-ID mod N), where T is a length of one paging cycle, UE-ID is a device identity of the terminal device, and N is an amount of PFs available for receiving a paging message in one paging cycle.

According to an exemplary embodiment, performing, by the network device, paging for the terminal device at a PO in the paging window according to a monitoring result includes:

sending, by the network device, a first channel carrying a paging message to the terminal device at the PO in the paging window according to the monitoring result, wherein the first channel includes a control channel and/or a data channel.

According to an exemplary embodiment, sending, by the network device, a first channel carrying a paging message to the terminal device at the PO in the paging window according to the monitoring result includes:

determining, by the network device, a Paging Radio Network Temporary Identifier (P-RNTI) used to send the first channel according to a position of the PO in the paging window; and sending, by the network device, the first channel to the terminal device at the PO in the paging window using the P-RNTI.

According to an exemplary embodiment, there is a one-to-one correspondence between the S candidate POs and S P-RNTIs, and the network device uses a P-RNTI corresponding to each PO to send the first channel at each PO.

According to an exemplary embodiment, the method further includes:

sending, by the network device, first indication information to the terminal device, wherein the first indication information is used to indicate a mapping relationship between the S candidate POs and the S P-RNTIs.

According to an exemplary embodiment, sending, by the network device, first indication information to the terminal device includes:

sending, by the network device, the first indication information through a carrier in a licensed frequency band.

According to an exemplary embodiment, sending, by the network device, first indication information to the terminal device includes:

sending, by the network device, the first indication information through a carrier in an unlicensed frequency band.

According to an exemplary embodiment, the first indication information is carried in a broadcast message or Radio Resource Control (RRC) signaling.

According to a second aspect, there is provided a method for paging, including:

determining, by a terminal device, a paging window for a network device to perform paging for a terminal device, wherein the paging window includes S candidate paging occasions (POs), and S is a positive integer greater than 1; and monitoring, by the terminal device, a paging message sent from the network device at the candidate paging window.

In embodiments of the present disclosure, when the network device and the terminal device listen in the unlicensed frequency band, they not only listen at one PO, but listen in a paging window. Thus, there are multiple opportunities for the network device to send paging messages in one paging cycle. Accordingly, when paging in the unlicensed frequency band, the delay in sending paging messages can be greatly reduced.

According to an exemplary embodiment, determining, by a terminal device, a paging window for a network device to perform paging for a terminal device, includes:

determining, by the terminal device, among a reference paging frame (PF) for the network device to perform paging for the terminal device, a reference PO; and determining, by the terminal device, the reference PO, M1 POs ahead of the reference PO and/or M2 POs after the reference PO, as the paging window, where M1 and M2 are positive integers.

According to an exemplary embodiment, an index of the reference PO is i_s=($\lfloor$UE-ID mod N$\rfloor$) mod Ns, wherein UE-ID is a device identity of the terminal device, N is an amount of PFs available for paging in one paging cycle, Ns is an amount of POs included in one PF, and $\lfloor$ $\rfloor$ means rounding down.

According to an exemplary embodiment, determining, by a terminal device, a paging window for a network device to perform paging for a terminal device, includes:

selecting, by the terminal device, S POs in at least one radio frame as the paging window, wherein the at least one radio frame includes a reference PF; or wherein the at least one radio frame includes the reference PF, K1 radio frames ahead of the reference PF and/or K2 radio frames after the reference PF, where K1 and K2 are positive integers.

According to an exemplary embodiment, selecting, by the terminal device, S POs in at least one radio frame as the paging window, includes:

receiving, by the terminal device, second indication information sent from the network device, wherein the second indication information is used to indicate positions of the S POs; or obtaining, by the terminal device, positions of the S POs which are pre-stored in the terminal device.

According to an exemplary embodiment, receiving, by the terminal device, second indication information sent from the network device, includes:

receiving, by the terminal device, the second indication information sent from the network device through a carrier in a licensed frequency band.

According to an exemplary embodiment, receiving, by the terminal device, second indication information sent from the network device, includes:

receiving, by the terminal device, the second indication information sent from the network device through a carrier in an unlicensed frequency band.

According to an exemplary embodiment, the second indication information is carried in a broadcast message or Radio Resource Control (RRC) signaling.

According to an exemplary embodiment, a System Frame Number (SFN) of the reference PF satisfies: SFN mod T=(T/N)×(UE-ID mod N), where T is a length of one paging cycle, UE-ID is a device identity of the terminal device, and N is an amount of PFs available for receiving the paging message in one paging cycle.

According to an exemplary embodiment, ahead of the terminal device monitors the paging message sent from the network device at the paging window, the method further includes:

receiving, by the terminal device, first indication information sent from the network device, wherein the first indication information is used to indicate a mapping relationship between the S candidate POs and S P-RNTIs, and the network device sends a first channel at each PO using a P-RNTI corresponding to each PO;

wherein monitoring, by the terminal device, a paging message sent from the network device at the paging window, includes:

monitoring, by the terminal device, the paging message sent from the network device at the paging window according to the first indication information.

According to an exemplary embodiment, receiving, by the terminal device, first indication information sent from the network device, includes:

receiving, by the terminal device, the first indication information sent from the network device through a carrier in a licensed frequency band.

According to an exemplary embodiment, receiving, by the terminal device, first indication information sent from the network device, includes:

receiving, by the terminal device, the first indication information sent from the network device through a carrier in an unlicensed frequency band.

According to an exemplary embodiment, the first indication information is carried in a broadcast message or Radio Resource Control (RRC) signaling.

According to a third aspect, there is provided a terminal device. The terminal device is configured for performing operations performed by the terminal device according to the first aspect or any one of the exemplary embodiments of the first aspect. Specifically, the terminal device may include modules or units for performing operations performed by the terminal device according to the first aspect or any one of the exemplary embodiments of the first aspect.

According to a fourth aspect, there is provided a network device. The network device is configured for performing operations performed by the network device according to the second aspect or any one of the exemplary embodiments of the second aspect. Specifically, the network device may include modules or units for performing operations performed by the terminal device according to the second aspect or any one of the exemplary embodiments of the second aspect.

According to a fifth aspect, there is provided a terminal device. The terminal device includes a processor, a transceiver and a memory. The processor, the transceiver and the memory communicate with each other via internal connection paths. The memory is configured to store instructions, and the processor is configured to execute instructions stored in the memory. When the processor executes the instructions stored in the memory, the execution causes the terminal device to execute the methods in the first aspect or any exemplary embodiment of the first aspect, or the execution causes the terminal device to implement the terminal device in the third aspect.

According to a sixth aspect, there is provided a network device. The network device includes a processor, a transceiver and a memory. The processor, the transceiver and the memory communicate with each other via internal connection paths. The memory is configured to store instructions, and the processor is configured to execute instructions stored in the memory. When the processor executes the instructions stored in the memory, the execution causes the network device to execute the methods in the second aspect or any exemplary embodiment of the second aspect, or the execution causes the network device to implement the network device in the fourth aspect.

According to a seventh aspect, there is provided a computer-readable storage medium having stored therein programs for instructing a terminal device to perform the methods for paging according to the first aspect or any exemplary embodiment of the first aspect.

According to an eighth aspect, there is provided a computer-readable storage medium having stored therein programs for instructing a network device to perform the methods for paging according to the second aspect or any exemplary embodiment of the second aspect.

According to a ninth aspect, there is provided a system chip. The system chip includes an input interface, an output interface, a processor, and a memory. The processor is configured to execute instructions stored in the memory. When the instructions are executed, the processor is caused to perform the method in the first aspect or any exemplary embodiment of the first aspect.

According to a tenth aspect, there is provided a system chip. The system chip includes an input interface, an output interface, a processor, and a memory. The processor is configured to execute instructions stored in the memory. When the instructions are executed, the processor is caused to perform the method in the second aspect or any exemplary embodiment of the second aspect.

According to an eleventh aspect, a computer program product including instructions is provided, which when executed on a computer, causes the computer to execute the methods in the first aspect or any exemplary embodiment of the first aspect.

According to a twelfth aspect, a computer program product including instructions is provided, which when executed on a computer, causes the computer to execute the methods in the second aspect or any exemplary embodiment of the second aspect.

DETAILED DESCRIPTION

Technical solutions in embodiments of the present disclosure will be described below with reference to the drawings.

It should be understood that the technical solutions of embodiments of the present disclosure may be applied to various communication systems, for example, Global System of Mobile Communication (GSM) system, Code Division Multiple Access (CDMA) system, wideband code Wideband Code Division Multiple Access (WCDMA) system, Long Term Evolution (LTE) system, LTE Frequency Division Duplex (FDD) system, LTE Time Division Duplex (TDD), Universal Mobile Telecommunication System (UMTS), or future 5G communication systems.

Various embodiments are described in connection with a terminal device. Terminal device in embodiments of the present disclosure can refer to User Equipment (UE), access terminal, subscriber unit, user station, mobile station, mobile terminal, remote station, remote terminal, mobile device, user terminal, terminal, wireless communication device, user agent or user device. The access terminal may be a cellular phone, a cordless phone, a Session Initiation Protocol (SIP) phone, a Wireless Local Loop (WLL) station, a Personal Digital Assistant (PDA), or a handheld device with wireless communication function, a computing device or other processing device connected to a wireless modem, an in-vehicle device, a wearable device, a terminal device in future 5G networks or a terminal device in future evolved Land Public Mobile Network (PLMN) networks.

Various embodiments are described in connection with a network device. The network device may be a device for communicating with the terminal device. For example, the network device may be a base station (Base Transceiver Station, BTS) in the GSM system or CDMA system, or a base station (NodeB, NB) in the WCDMA system, or the network device may be Evolutional Node B (eNB or eNodeB) in the LTE system, or the network device may be a relay station, an access point, a vehicle-mounted device, a wearable device, a network-side device in future 5G networks, or a network-side device in future evolved PLMN networks, or the like.

Figures 1, 2:
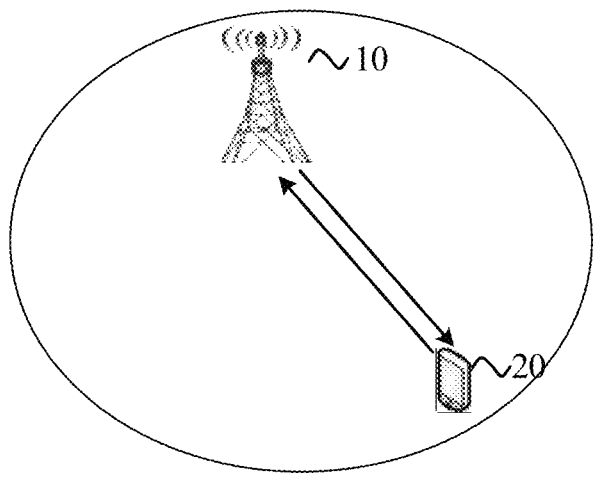
FIG. 1 is a schematic architectural diagram showing an application scenario according to an embodiment of the present disclosure.
FIG. 2 is a schematic flowchart of a method for paging according to an embodiment of the present disclosure.

FIG. 1 is a schematic diagram showing an application scenario according to an embodiment of the present disclosure. The communication system in FIG. 1 may include a network device 10 and a terminal device 20. The network device 10 is used to provide communication services for the terminal device 20 and access a core network. The terminal device 20 can access the network by searching for synchronization signals, broadcast signals, or the like sent by the network device 10, thereby performing communication with the network. The arrows shown in FIG. 1 may represent uplink/downlink transmissions through the cellular links between the terminal device 20 and the network device 10.

The network in embodiments of the present disclosure may refer to a Public Land Mobile Network (PLMN) or a device to device (D2D) network or a Machine to Machine/Man (M2M) network, or other network. FIG. 1 is only a simplified schematic diagram, and the network may also include other terminal devices, which are not shown in FIG. 1.

When downlink data for the terminal device arrives, the network device can page the terminal device to establish a signaling connection between the terminal device and the network device, thereby transmitting the downlink data.

The method shown in FIG. 2 may be performed by a network device, and the network device may be, for example, the network device 10 shown in FIG. 1. As shown in FIG. 2, the method for paging includes:

In 210, the network device determines a paging window for performing paging for a terminal device. The paging window includes S candidate paging occasions (POs), and S is a positive integer greater than 1.

According to an exemplary embodiment, the network device may indicate the value of S to the terminal device, or the value of S may be agreed in advance between the network device and the terminal device, for example, through a protocol, and may be stored in the terminal device.

According to an exemplary embodiment, a PO may be a time slot. For example, in a 5G system, a time slot includes 14 symbols, and a PO may include 14 symbols.

In 220, the network device monitors whether a carrier in an unlicensed frequency band is idle based on the paging window.

Specifically, the network device listens to whether a carrier in the unlicensed frequency band is idle in a paging window. When a carrier at a PO in the paging window is idle, the network device may page the terminal device at the PO. The paging window includes S candidate POs, and S is a positive integer greater than 1. When the network device performs listening, the network device not only listens at one PO, but listens in a paging window. Therefore, in a paging cycle, the network device may have multiple opportunities to send paging messages. Accordingly, when paging in an unlicensed frequency band, the delay in sending paging messages can be greatly reduced.

According to an exemplary embodiment, after 220, the method further includes: performing, by the network device, paging for the terminal device at a PO in the paging window according to a monitoring result.

It should be understood that, based on the paging window, the network device monitors whether a carrier in the unlicensed frequency band is idle. If it is detected that the carrier is idle at a certain PO in the paging window, the network device can page the terminal device at the PO. If no idle PO is monitored in the paging window, the device can for example listen in the paging window in the next paging cycle until an idle PO is detected to page the terminal device.

Embodiments of the present disclosure provide two methods for determining the paging window, which are described in detail below.

Method 1

According to an exemplary embodiment, in 210, determining, by a network device, a paging window for paging a terminal device includes: determining, by the network device, among a reference paging frame (PF) for performing paging for the terminal device, a reference PO; and determining, by the network device, the reference PO, M1 POs ahead of the reference PO and/or M2 POs after the reference PO, as the paging window, where M1 and M2 are positive integers.

In the embodiments, M1 and M2 are positive integers, and M1 and M2 may be equal or unequal. In addition, the value of M1 and/or M2 may be configured by the network device for the terminal device, or the value of M1 and/or M2 may also be agreed between the network device and the terminal device in advance, for example, through a protocol, and may be stored in the terminal device.

In the reference PF, the occasion position for paging includes not only the reference PO, but also S candidate POs in the paging window. Since the occasion position for paging is extended based on the reference PO, so that the paging window includes the reference PO, and the M1 POs ahead of the reference PO and/or the M2 POs after the reference PO. For example, the S candidate POs include the reference PO and M1 consecutive POs ahead of the reference PO, or include the reference PO and the M2 consecutive POs after the reference PO, or include the reference PO, the M1 consecutive POs ahead of the PO and the M2 consecutive POs after the reference PO.

According to an exemplary embodiment, an index of the reference PO is $i\_s = (\lfloor \text{UE-ID} \bmod N \rfloor) \bmod Ns$, wherein UE-ID is a device identity of the terminal device, N is an amount of PFs available for paging in one paging cycle, Ns is an amount of POs included in one PF, and $\lfloor \ \rfloor$ means rounding down.

According to an exemplary embodiment, a System Frame Number (SFN) of the reference PF satisfies: $\text{SFN} \bmod T = (T/N) \times (\text{UE-ID} \bmod N)$, where T is a duration of one paging cycle, UE-ID is a device identity of the terminal device, and N is an amount of PFs available for receiving a paging message in one paging cycle.

Specifically, the PF is a specific radio frame or may be called as system frame. The PF may include one or more POs. The terminal device may try to receive a paging message at a certain PO in the PF in a paging cycle. A Physical Downlink Control Channel (PDCCH) that is scrambled using a Paging Radio Network Temporary Identity (P-RNTI) and indicates the paging message is transmitted at the PO. The terminal device only needs to detect one PO in each paging cycle. In other words, for each terminal device, only one subframe can be used to send a paging message in each paging cycle, PF is the system frame used to send the paging message, and PO is the subframe in the PF for sending the paging message. In embodiments of the present application, the PF whose system frame number satisfies $\text{SFN} \bmod T = (T/N) \times (\text{UE-ID} \bmod N)$ is referred to as a reference PF.

In $\text{SFN} \bmod T = (T/N) \times (\text{UE-ID1} \bmod N)$, T/N is equivalent to dividing each DRX cycle T into N parts, and each part includes T/N radio frames, where PF is the first radio frame among the T/N radio frames. Therefore, N can be regarded as the number of PFs available for receiving the paging message in each DRX cycle. N can be determined as follows: N=min (T, nB), where nB can be configured by System Information Block (SIB), for example, nB can be equal to 4T, 2T, T, T/2, T/4, T/8, and so on.

UE-ID mod N means that the terminal device selects the (UE-ID mod N)-th one (0≤(UE ID mod N)<N) among the N parts. It can be seen that which part of the N parts the network device selects is determined by the device identity UE-ID of the terminal device. The device identity UE-ID of the terminal device may be determined by the International Mobile Subscriber Identity (IMSI) of the terminal device, for example, UE ID=IMSI mod 1204. The terminal device selects the (UE-ID mod N)-th part among the N parts, and uses the PF included in the (UE-ID mod N)-th part. The system frame number SFN of the PF may be determined based on SFN mod T=(T/N)×(UE-ID1 mod N).

After the reference PF is determined, the network device may determine the reference PO in the reference PF.

According to an exemplary embodiment, the reference PO may be any PO in the reference PF, or the reference PO may be determined according to $i\_s=(\lceil UE\text{-}ID \bmod N \rceil) \bmod N_s$, wherein $i\_s$ is the index of the reference PO, and Ns is an amount of POs included in the PF. According to i_s and Ns, the network device can determine PO based on, for example, Table 1 (the case of using Frequency Division Duplex (FDD)) or Table 2 (the case of using Time Division Duplex (TDD)). After the reference PO is determined, the candidate S POs, that is, the paging window, can be determined in view of the values of M1 and M2.

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

Method 2

According to an exemplary embodiment, in 210, determining, by a network device, a paging occasion position for paging a terminal device, includes: selecting, by the network device, S POs in at least one radio frame as the paging window, wherein the at least one radio frame includes a reference PF; or wherein the at least one radio frame includes the reference PF, K1 radio frames ahead of the reference PF and/or K2 radio frames after the reference PF, where K1 and K2 are positive integers.

In the embodiments, K1 and K2 are positive integers, and K1 and K2 may be equal or unequal. In addition, the value of K1 and/or K2 may be configured by the network device for the terminal device, or the value of K1 and/or K2 may also be agreed between the network device and the terminal device in advance, for example, through a protocol, and may be stored in the terminal device.

In embodiments, the network device may select S consecutive POs in the reference PF as the paging window; or, the network device may select S consecutive POs in the reference PF and the K1 radio frames ahead of the reference PF as the paging window; or, the network device may select S consecutive POs in the reference PF and K2 radio frames after the reference PF as the paging window; or the network device may select S POs in the reference PF, the K1 radio frames ahead of the reference PF and K2 radio frames after the reference PF.

For the determination of the reference PF, for example, reference may be made to the relevant description in Method 1, and repeated descriptions are omitted here.

According to an exemplary embodiment, the method further includes: sending, by the network device, second indication information to the terminal device, wherein the second indication information is used to indicate positions of the S POs.

For example, the network device may indicate to the terminal device the value of S and/or relative positions of the S POs in the at least one radio frame (the reference PF; or, the reference PF, K1 radio frames ahead of the reference PF and/or K2 radio frames after the reference PF. Alternatively, the value of S and/or relative positions of the S POs in the at least one radio frame may be agreed between the network device and the terminal device in advance, for example, through a protocol, and can be stored in the terminal device.

According to an exemplary embodiment, sending, by the network device, second indication information to the terminal device includes: sending, by the network device, the second indication information through a carrier in a licensed frequency band.

According to an exemplary embodiment, sending, by the network device, second indication information to the terminal device includes: sending, by the network device, the second indication information through a carrier in an unlicensed frequency band.

According to an exemplary embodiment, the second indication information is carried in a broadcast message or Radio Resource Control (RRC) signaling.

After the network device determines the paging window, the network device listens in the unlicensed frequency band based on the paging window, and pages the terminal device in one of the S candidate POs in the paging window according to the listening result.

According to an exemplary embodiment, in 230, performing, by the network device, paging for the terminal device at a PO in the paging window according to a monitoring result includes: sending, by the network device, a first channel carrying a paging message to the terminal device at the PO in the paging window according to the monitoring result, wherein the first channel includes a control channel and/or a data channel.

For example, the one PO may be used to transmit a Physical Downlink Shared Channel (PDSCH) and/or a Physical Downlink Control Channel (PDCCH).

If the PO is used to transmit the PDSCH and the PDCCH, the PDSCH can be transmitted at the same time position (occupying the same symbol) as the PDCCH, and under such condition, the PDSCH and the PDCCH can be frequency-division multiplexed.

Alternatively, if the PO is used to transmit the PDSCH and PDCCH, the PDSCH and PDCCH may be sent at time positions. For example, the PDCCH may be transmitted through multi-beams first, and then the PDSCH may be transmitted through multi-beams. For example, the PDCCH or PDSCH can be sent on different symbols through the same or different beams once, and then the PDCCH and PDSCH can be sent on other different symbols again using the same or difference beams, and so on.

According to an exemplary embodiment, sending, by the network device, a first channel carrying a paging message to the terminal device at the PO in the paging window according to the monitoring result includes: determining, by the network device, a Paging Radio Network Temporary Identifier (P-RNTI) used to send the first channel according to a position of the PO in the paging window; and sending, by the network device, the first channel to the terminal device at the PO in the paging window using the P-RNTI.

According to an exemplary embodiment, there is a one-to-one correspondence between the S candidate POs and S P-RNTIs, and the network device uses a P-RNTI corresponding to each PO to send the first channel at each PO.

In order to avoid mutual influence between paging messages sent at different POs, different P-RNTIs can be used to scramble paging messages sent at different POs.

For example, in the reference PF, the paging window used by the network device to page a terminal device includes first to third POs. If at this time, the PO determined according to the device identity of another terminal device is also the third PO, that is, the third PO also needs to be used to page another terminal device, the network device needs to send control channel and/or data channel including respective paging messages to the two different terminal device, and thus the two channels will affect each other, or even interfere may occur.

Therefore, the S candidate POs can be in one-to-one correspondence with the S different P-RNTIs. When the network device determines to perform paging at one of the S candidate POs according to the listening result, the network device can use the P-RNTI corresponding to the PO to scramble the control channel and/or data channel carrying the paging messages. When the POs selected for sending the paging messages among the S candidate POs are different, the P-RNTIs used for scrambling the first channel carrying the paging messages are also different.

For example, it is assumed that the S candidate POs include the reference PO and two POs after the reference PO. It is also assumed that the reference PO is the n-th PO in the reference PF, the P-RNTI used by the network device to send the paging message at the reference PO is the first P-RNTI, the P-RNTI used by the network device to send the paging message at the (n+1)-th PO is the second P-RNTI, and the P-RNTI used by the network device to send the paging message at the (n+2)-th PO is the third P-RNTI. The first P-RNTI, the second P-RNT and the third P-RNT are all different. The network device uses different P-RNTIs to send paging messages at different POs.

According to an exemplary embodiment, the method further includes: sending, by the network device, first indication information to the terminal device, wherein the first indication information is used to indicate a mapping relationship between the S candidate POs and the S P-RNTIs.

According to an exemplary embodiment, sending, by the network device, first indication information to the terminal device includes: sending, by the network device, the first indication information through a carrier in a licensed frequency band.

According to an exemplary embodiment, sending, by the network device, first indication information to the terminal device includes: sending, by the network device, the first indication information through a carrier in an unlicensed frequency band.

According to an exemplary embodiment, the first indication information is carried in a broadcast message or Radio Resource Control (RRC) signaling.

Figure 3:
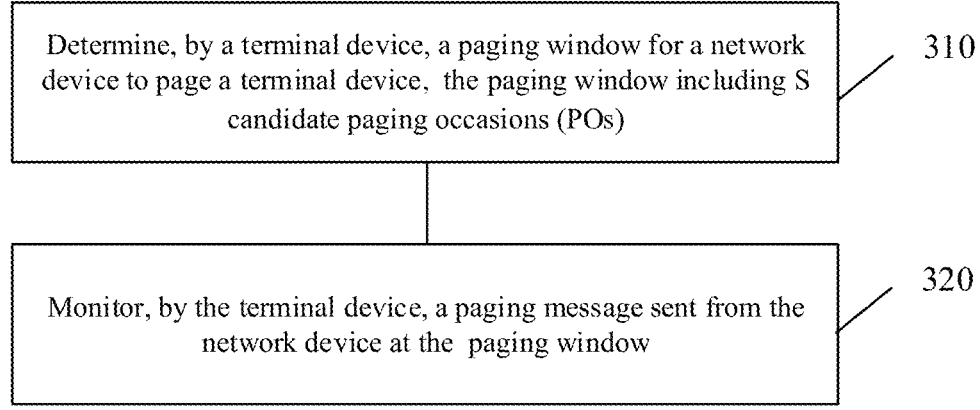
FIG. 3 is a schematic flowchart of a method for paging according to an embodiment of the present disclosure.

FIG. 3 is a schematic flowchart of a method for paging according to an embodiment of the present disclosure. The method shown in FIG. 3 may be executed by a terminal device, and the terminal device may be, for example, the terminal device 20 shown in FIG. 1. As shown in FIG. 3, the method for paging includes:

In 310, the terminal device determines a paging window for a network device to perform paging for a terminal device. The paging window includes S candidate paging occasions (POs), and S is a positive integer greater than 1.

In 320, the terminal device monitors a paging message sent from the network device at the candidate paging window.

In embodiments of the present disclosure, when the network device and the terminal device listen in the unlicensed frequency band, they not only listen at one PO, but listen in a paging window. Thus, there are multiple opportunities for the network device to send paging messages in one paging cycle. Accordingly, when paging in the unlicensed frequency band, the delay in sending paging messages can be greatly reduced.

According to an exemplary embodiment, determining, by a terminal device, a paging window for a network device to perform paging for a terminal device, includes:

determining, by the terminal device, among a reference paging frame (PF) for the network device to perform paging for the terminal device, a reference PO; and determining, by the terminal device, the reference PO, M1 POs ahead of the reference PO and/or M2 POs after the reference PO, as the paging window, where M1 and M2 are positive integers.

According to an exemplary embodiment, an index of the reference PO is $i\_s = (\lfloor \text{UE-ID mod N} \rfloor) \bmod N_s$, wherein UE-ID is a device identity of the terminal device, N is an amount of PFs available for paging in one paging cycle, Ns is an amount of POs included in one PF, and $\lfloor \ \rfloor$ means rounding down.

According to an exemplary embodiment, determining, by a terminal device, a paging window for a network device to perform paging for a terminal device, includes:

selecting, by the terminal device, S POs in at least one radio frame as the paging window, wherein the at least one radio frame includes a reference PF; or wherein the at least one radio frame includes the reference PF, K1 radio frames ahead of the reference PF and/or K2 radio frames after the reference PF, where K1 and K2 are positive integers.

According to an exemplary embodiment, selecting, by the terminal device, S POs in at least one radio frame as the paging window, includes receiving, by the terminal device, second indication information sent from the network device, wherein the second indication information is used to indicate positions of the S POs; or obtaining, by the terminal device, positions of the S POs which are pre-stored in the terminal device.

According to an exemplary embodiment, receiving, by the terminal device, second indication information sent from the network device, includes:

receiving, by the terminal device, the second indication information sent from the network device through a carrier in a licensed frequency band.

According to an exemplary embodiment, receiving, by the terminal device, second indication information sent from the network device, includes:

receiving, by the terminal device, the second indication information sent from the network device through a carrier in an unlicensed frequency band.

According to an exemplary embodiment, the second indication information is carried in a broadcast message or Radio Resource Control (RRC) signaling.

According to an exemplary embodiment, a System Frame Number (SFN) of the reference PF satisfies: SFN mod T=(T/N)×(UE-ID mod N), where T is a length of one paging cycle, UE-ID is a device identity of the terminal device, and N is an amount of PFs available for receiving the paging message in one paging cycle.

According to an exemplary embodiment, before the terminal device monitors the paging message sent from the network device at the paging window, the method further includes:

receiving, by the terminal device, first indication information sent from the network device, wherein the first indication information is used to indicate a mapping relationship between the S candidate POs and S P-RNTIs, and the network device sends a first channel at each PO using a P-RNTI corresponding to each PO;

wherein monitoring, by the terminal device, a paging message sent from the network device at the paging window, includes:

monitoring, by the terminal device, the paging message sent from the network device at the paging window according to the first indication information.

According to an exemplary embodiment, receiving, by the terminal device, first indication information sent from the network device, includes:

receiving, by the terminal device, the first indication information sent from the network device through a carrier in a licensed frequency band.

According to an exemplary embodiment, receiving, by the terminal device, first indication information sent from the network device, includes:

receiving, by the terminal device, the first indication information sent from the network device through a carrier in an unlicensed frequency band.

According to an exemplary embodiment, the first indication information is carried in a broadcast message or Radio Resource Control (RRC) signaling.

It should be understood that the specific process for the terminal device to monitor the paging message sent from the network device can be found in the description related to FIG. 2, and repeated descriptions are omitted here.

It should also be understood that, in various embodiments of the present disclosure, the sequence number of the above processes does not mean that the execution order is sequential, the execution order of processes should be determined by their functions and inherent logic, and the execution order of processes of the present disclosure is not limited to that described above.

The method embodiments of the present disclosure are described in detail above, and the device embodiments of the present disclosure will be described below with reference to FIGS. 4 to 7. The technical features described in the method embodiment are applicable to the following device embodiments.

Figure 4:
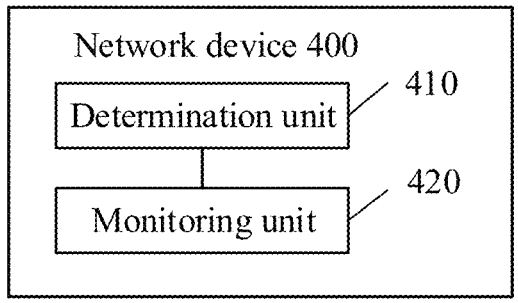
FIG. 4 is a schematic block diagram of a terminal device according to an embodiment of the present disclosure.

FIG. 4 is a schematic block diagram of a network device 400 according to an embodiment of the present disclosure. As shown in FIG. 4, the network device 400 includes a determination unit 410 and a monitoring unit 420.

The determination unit 410 is configured to determine a paging window for performing paging for a terminal device, wherein the paging window includes S candidate paging occasions (POs), and S is a positive integer greater than 1.

The monitoring unit 420 is configured to monitor whether a carrier in an unlicensed frequency band is idle based on the paging window.

In embodiments of the present disclosure, when the network device and the terminal device listen in the unlicensed frequency band, they not only listen at one PO, but listen in a paging window. Thus, there are multiple opportunities for the network device to send paging messages in one paging cycle. Accordingly, when paging in the unlicensed frequency band, the delay in sending paging messages can be greatly reduced.

According to an exemplary embodiment, the network device further includes a sending unit configured to page the terminal device at a PO in the paging window according to a monitoring result of the monitoring unit 420.

According to an exemplary embodiment, the determination unit 410 is configured to:

Determine, among a reference paging frame (PF) for performing paging for the terminal device, a reference PO; and determine the reference PO, M1 POs ahead of the reference PO and/or M2 POs after the reference PO, as the paging window, where M1 and M2 are positive integers.

According to an exemplary embodiment, an index of the reference PO is i_s=(⌊UE-ID mod N⌋) mod Ns, wherein UE-ID is a device identity of the terminal device, N is an amount of PFs available for paging in one paging cycle, Ns is an amount of POs included in one PF, and ⌈ ⌉ means rounding down.

According to an exemplary embodiment, the determination unit 410 is configured to:

select S POs in at least one radio frame as the paging window, wherein the at least one radio frame includes a reference PF; or wherein the at least one radio frame includes the reference PF, K1 radio frames ahead of the reference PF and/or K2 radio frames after the reference PF, where K1 and K2 are positive integers.

According to an exemplary embodiment, the sending unit is further configured to:

send second indication information to the terminal device, wherein the second indication information is used to indicate positions of the S POs.

According to an exemplary embodiment, a System Frame Number (SFN) of the reference PF satisfies: SFN mod T=(T/N)×(UE-ID mod N), where T is a length of one paging cycle, UE-ID is a device identity of the terminal device, and N is an amount of PFs available for receiving a paging message in one paging cycle.

According to an exemplary embodiment, the sending unit is configured to: send a first channel carrying a paging message to the terminal device at the PO in the paging window according to the monitoring result, wherein the first channel includes a control channel and/or a data channel.

According to an exemplary embodiment, the determination unit 410 is further configured to:

determine a Paging Radio Network Temporary Identifier (P-RNTI) used to send the first channel according to a position of the PO in the paging window; and the sending unit is configured to send the first channel to the terminal device at the PO in the paging window using the P-RNTI.

According to an exemplary embodiment, there is a one-to-one correspondence between the S candidate POs and S P-RNTIs, and the network device uses a P-RNTI corresponding to each PO to send the first channel at each PO.

According to an exemplary embodiment, the sending unit is configured to:

send first indication information to the terminal device, wherein the first indication information is used to indicate a mapping relationship between the S candidate POs and the S P-RNTIs.

It should be understood that the network device 400 may correspond to the network device in the method 200, and may be used to implement the operations implemented by the network device in the method 200.

Figure 5:
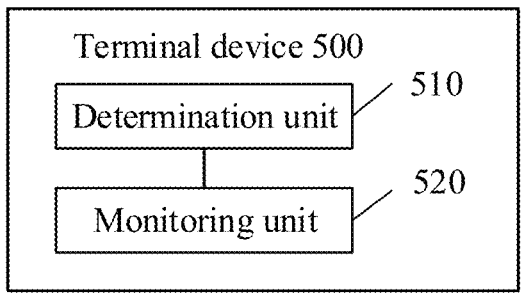
FIG. 5 is a schematic block diagram of a network device according to an embodiment of the present disclosure.

FIG. 5 is a schematic block diagram of a terminal device 500 according to an embodiment of the present disclosure. As shown in FIG. 5, the terminal device 500 includes a determination unit 510 and a monitoring unit 520.

The determination unit 510 is configured to determine a paging window for a network device to perform paging for a terminal device, wherein the paging window includes S candidate paging occasions (POs), and S is a positive integer greater than 1.

The monitoring unit 520 is configured to monitor a paging message sent from the network device at the candidate paging window.

In embodiments of the present disclosure, when the network device and the terminal device listen on the unlicensed frequency band, they not only listen at one PO, but listen in a paging window. Thus, there are multiple opportunities for the network device to send paging messages in one paging cycle. Accordingly, when paging in the unlicensed frequency band, the delay in sending paging messages can be greatly reduced.

According to an exemplary embodiment, the determination unit 510 is configured to:

determine, among a reference paging frame (PF) for the network device to perform paging for the terminal device, a reference PO; and determine the reference PO, M1 POs ahead of the reference PO and/or M2 POs after the reference PO, as the paging window, where M1 and M2 are positive integers.

According to an exemplary embodiment, an index of the reference PO is $i\_s = (\lfloor UE\text{-}ID \bmod N \rfloor) \bmod Ns$, wherein UE-ID is a device identity of the terminal device, N is an amount of PFs available for paging in one paging cycle, Ns is an amount of POs included in one PF, and $\lceil\ \rceil$ means rounding down.

According to an exemplary embodiment, the determination unit 510 is configured to:

select S POs in at least one radio frame as the paging window, wherein the at least one radio frame includes a reference PF; or wherein the at least one radio frame includes the reference PF, K1 radio frames ahead of the reference PF and/or K2 radio frames after the reference PF, where K1 and K2 are positive integers.

According to an exemplary embodiment, the determination unit 510 is configured to:

receive second indication information sent from the network device via a receiving unit, wherein the second indication information is used to indicate positions of the S POs; or obtain positions of the S POs which are pre-stored in the terminal device.

According to an exemplary embodiment, a System Frame Number (SFN) of the reference PF satisfies: $SFN \bmod T = (T/N) \times (UE\text{-}ID \bmod N)$, where T is a length of one paging cycle, UE-ID is a device identity of the terminal device, and N is an amount of PFs available for receiving the paging message in one paging cycle.

According to an exemplary embodiment, the terminal device further includes a receiving unit configured to receive first indication information sent from the network device, wherein the first indication information is used to indicate a mapping relationship between the S candidate POs and S P-RNTIs, and the network device sends a first channel at each PO using a P-RNTI corresponding to each PO;

the monitoring unit 520 is configured to:

monitor the paging message sent from the network device at the paging window according to the first indication information.

It should be understood that the terminal device 500 may correspond to the terminal device in the method 300, and may be used to implement the operations implemented by the terminal device in the method 300.

Figure 6:
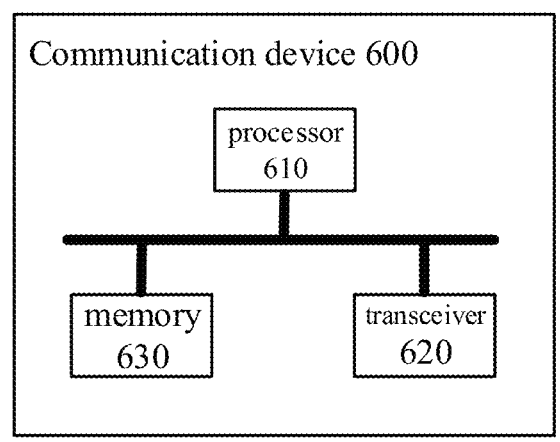
FIG. 6 is a schematic structural diagram of a communication device according to an embodiment of the present disclosure.

FIG. 6 is a schematic structural diagram of a communication device 600 according to an embodiment of the present disclosure. As shown in FIG. 6, the communication device includes a processor 610, a transceiver 620, and a memory 630. The processor 610, the transceiver 620, and the memory 630 communicate with each other through internal connection paths. The memory 630 is configured to store instructions, and the processor 610 is configured to execute the instructions stored in the memory 630 to control transceiver 620 to receive signals or send signals.

According to an exemplary embodiment, the processor 610 may call the program codes stored in the memory 630 to perform corresponding operations of the method 200 performed by the network device. For the sake of brevity, details are not described herein again.

According to an exemplary embodiment, the processor 610 may call the program codes stored in the memory 630 to perform corresponding operations of the method 300 performed by the terminal device. For the sake of brevity, details are not described herein again.

It should be understood that the processor in embodiments of the present disclosure may be an integrated circuit chip, which has signal processing capabilities. In the implementation process, each step of the foregoing method embodiments may be completed by hardware integrated logic circuit in a processor or software instructions. The processor may be a general-purpose processor, a digital signal processor (DSP), an application specific integrated circuit (ASIC), a Field Programmable Gate Array (FPGA), or other programming logic devices, discrete gates or transistor logic devices, discrete hardware components. The methods, steps, and logical block diagrams disclosed in the embodiments of the present disclosure may be implemented or executed. The general-purpose processor may be a microprocessor or the processor may be any conventional processor or the like. The steps of the methods disclosed in embodiments of the present disclosure may be directly executed by a hardware decoding processor, or may be executed and completed by a combination of hardware and software modules in the decoding processor. The software modules may be located in a storage medium in the art, such as random access memory, flash memory, read-only memory, programmable read-only memory, or electrically erasable programmable memory, and registers. The storage medium is located in the memory, and the processor reads the information in the memory to perform the steps of the above methods in combination with hardware.

It can be understood that the memory in embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of example but not limitation, many forms of RAM are available, such as Static RAM (SRAM), Dynamic RAM (DRAM), Synchronous DRAM (SDRAM), Double Date Rate SDRAM (DDR SDRAM), Enhanced SDRAM (ESDRAM), Synchlink DRAM (SLDRAM)) and Direct Rambus RAM (DR RAM). It should be noted that the memory for implementing the systems and methods described herein is intended to include, but not limited to these and any other suitable types of memories.

Figure 7:
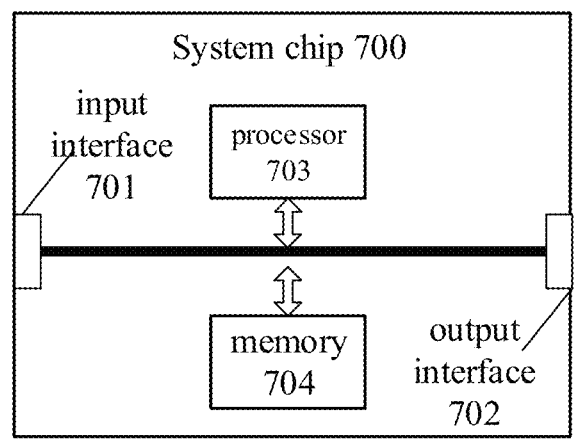
FIG. 7 is a schematic structural diagram of a system chip according to an embodiment of the present disclosure.

FIG. 7 is a schematic structural diagram of a system chip according to an embodiment of the present disclosure. The system chip 700 of FIG. 7 includes an input interface 701, an output interface 702, at least one processor 703, and a memory 704. The input interface 701, the output interface 702, the processor 703, and the memory 704 are connected to each other through an internal connection path. The processor 703 is used to execute the codes in the memory 704.

According to an exemplary embodiment, when the codes are executed, the processor 703 may implement the method 200 executed by the network device in the method embodiments. For brevity, repeated descriptions are omitted.

According to an exemplary embodiment, when the codes are executed, the processor 703 may implement the method 300 executed by the terminal device in the method embodiments. For brevity, repeated descriptions are omitted.

It should be understood that in the embodiments of the present disclosure, "B corresponding to A" indicates that B is associated with A, and B can be determined according to A. However, it should also be understood that determining B based on A does not mean determining B based on A alone, and B may also be determined based on A and/or other information.

It should also be understood that the term "and/or" herein describes an association relationship between associated objects, and indicates that there may be three relationships, for example, A and/or B may indicate: there exists A alone, both A and B exist, there exists B alone. In addition, the character "/" generally indicates that the related objects before and after "/" are in an "or" relationship.

Those of ordinary skill in the art will appreciate that the exemplary units and algorithm steps described according to the implementations disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method implementations.

In the implementations provided in the present disclosure, it should be understood that the disclosed systems, devices and methods may be implemented in other ways. For example, the device implementations described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the implementations.

In addition, the functional units in the implementations of the present disclosure may be integrated in one monitoring unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the implementations of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for paging, comprising:
   determining, by a network device, a paging window for performing paging for a terminal device, wherein the paging window comprises S candidate paging occasions (POs), and S is a positive integer greater than 1; and
   monitoring, by the network device, whether a carrier in an unlicensed frequency band is idle based on the paging window;
   wherein the determining, by the network device, the paging window for paging the terminal device comprises:
   selecting, by the network device, S POs in a plurality of radio frames as the paging window for the terminal device, wherein the plurality of radio frames comprise a reference paging frame (PF),
   K1 radio frames ahead of the reference PF and/or K2 radio frames after the reference PF, where K1 and K2 are positive integers,
   wherein the reference PF has a System Frame Number (SFN) which satisfies: SFN mod T=(T/N)×(UE-ID mod N), where T is a length of one paging cycle, UE-ID is a device identity of the terminal device, and N is an amount of PFs available for receiving a paging message in one paging cycle.

2. The method according to claim 1, further comprising: performing, by the network device, paging for the terminal device at a PO in the paging window according to a monitoring result.

3. The method according to claim 1, wherein determining, by the network device, the paging window for performing paging for the terminal device further comprises:
determining, by the network device, among the reference PF for performing paging for the terminal device, a reference PO; and
determining, by the network device, the reference PO, M1 POs ahead of the reference PO and/or M2 POs after the reference PO, as the paging window, where M1 and M2 are positive integers.

4. The method according to claim 3, wherein an index of the reference PO is i_s=(⌈UE-ID mod N⌉) mod Ns, wherein UE-ID is a device identity of the terminal device, N is an amount of PFs available for paging in one paging cycle, Ns is an amount of POs comprised in one PF, and ⌈ ⌉ means rounding down.

5. A method for paging, comprising:
determining, by a terminal device, a paging window for a network device to perform paging for the terminal device, wherein the paging window comprises S candidate paging occasions (POs), and S is a positive integer greater than 1; and
monitoring, by the terminal device, a paging message sent from the network device at the candidate paging window;
wherein the determining, by the terminal device, the paging window for the network device to perform paging for the terminal device further comprises:
selecting, by the terminal device, S POs in a plurality of radio frames as the paging window for the terminal device, wherein the plurality of radio frames comprise a reference paging frame (PF),
K1 radio frames ahead of the reference PF and/or K2 radio frames after the reference PF, where K1 and K2 are positive integers,
wherein the reference PF has a System Frame Number (SFN) which satisfies: SFN mod T=(T/N)×(UE-ID mod N), where T is a length of one paging cycle, UE-ID is a device identity of the terminal device, and N is an amount of PFs available for receiving a paging message in one paging cycle.

6. The method according to claim 5, wherein determining, by the terminal device, the paging window for the network device to perform paging for the terminal device, further comprises:
determining, by the terminal device, among a reference paging frame (PF) for the network device to perform paging for the terminal device, a reference PO; and
determining, by the terminal device, the reference PO, M1 POs ahead of the reference PO and/or M2 POs after the reference PO, as the paging window, where M1 and M2 are positive integers.

7. The method according to claim 6, wherein an index of the reference PO is i_s=(⌈UE-ID mod N⌉) mod Ns, wherein UE-ID is a device identity of the terminal device, N is an amount of PFs available for paging in one paging cycle, Ns is an amount of POs comprised in one PF, and ⌈ ⌉ means rounding down.

8. The method according to claim 5, wherein selecting, by the terminal device, S POs in at least one radio frame as the paging window, comprises:
receiving, by the terminal device, second indication information sent from the network device, wherein the second indication information is used to indicate positions of the S POs; or
obtaining, by the terminal device, positions of the S POs which are pre-stored in the terminal device.

9. The method according to claim 8, wherein receiving, by the terminal device, second indication information sent from the network device, comprises:
receiving, by the terminal device, the second indication information sent from the network device through a carrier in a licensed frequency band.

10. The method according to claim 8, wherein receiving, by the terminal device, second indication information sent from the network device, comprises:
receiving, by the terminal device, the second indication information sent from the network device through a carrier in an unlicensed frequency band.

11. A network device, comprising:
a processor;
a memory for storing instructions executable by the processor;
wherein when the instructions are executed, the network device is caused to:
determine a paging window for performing paging for a terminal device, wherein the paging window comprises S candidate paging occasions (POs), and S is a positive integer greater than 1; and
monitor whether a carrier in an unlicensed frequency band is idle based on the paging window;
wherein when the instructions are executed, the network device is caused to:
select S POs in a plurality of radio frames as the paging window for the terminal device, wherein the plurality of radio frames comprise a reference PF),
K1 radio frames ahead of the reference PF and/or K2 radio frames after the reference PF, where K1 and K2 are positive integers,
wherein the reference PF has a System Frame Number (SFN) which satisfies: SFN mod T=(T/N)×(UE-ID mod N), where T is a length of one paging cycle, UE-ID is a device identity of the terminal device, and N is an amount of PFs available for receiving a paging message in one paging cycle.

12. The network device according to claim 11, wherein when the instructions are executed, the network device is further caused to:
page the terminal device at a PO in the paging window according to a monitoring result.

13. The network device according to claim 11, wherein when the instructions are executed, the network device is caused to:
determine, among the reference PF for performing paging for the terminal device, a reference PO; and
determine the reference PO, M1 POs ahead of the reference PO and/or M2 POs after the reference PO, as the paging window, where M1 and M2 are positive integers.

14. The network device according to claim 13, wherein an index of the reference PO is i_s=(⌈UE-ID mod N⌉) mod Ns, wherein UE-ID is a device identity of the terminal device, N is an amount of PFs available for paging in one paging cycle, Ns is an amount of POs comprised in one PF, and ⌈ ⌉ means rounding down.

15. A terminal device for paging, comprising:
a processor;
a memory for storing instructions executable by the processor;
wherein when the instructions are executed, the terminal device is caused to:
determine a paging window for a network device to perform paging for a terminal device, wherein the paging window comprises S candidate paging occasions (POs), and S is a positive integer greater than 1; and
monitor a paging message sent from the network device at the paging window;
wherein when the instructions are executed, the terminal device is caused to:
select S POs in a plurality of radio frames as the paging window for the terminal device, wherein the plurality of radio frames comprise a reference PF),
K1 radio frames ahead of the reference PF and/or K2 radio frames after the reference PF, where K1 and K2 are positive integers,
wherein the reference PF has a System Frame Number (SFN) which satisfies: SFN mod T=(T/N)×(UE-ID mod N), where T is a length of one paging cycle, UE-ID is a device identity of the terminal device, and N is an amount of PFs available for receiving a paging message in one paging cycle.

16. The terminal device according to claim 15, wherein when the instructions are executed, the terminal device is caused to:
determine, among the reference PF for the network device to perform paging for the terminal device, a reference PO; and
determine the reference PO, M1 POs ahead of the reference PO and/or M2 POs after the reference PO, as the paging window, where M1 and M2 are positive integers.

17. The terminal device according to claim 16, wherein an index of the reference PO is i_s=(⌈UE-ID mod N⌉) mod Ns, wherein UE-ID is a device identity of the terminal device, N is an amount of PFs available for paging in one paging cycle, Ns is an amount of POs comprised in one PF, and ⌈ ⌉ means rounding down.

18. The terminal device according to claim 15, wherein when the instructions are executed, the terminal device is caused to:
receive second indication information sent from the network device, wherein the second indication information is used to indicate positions of the S POs; or
obtain positions of the S POs which are pre-stored in the terminal device.

19. The terminal device according to claim 18, wherein when the instructions are executed, the terminal device is caused to:
receive the second indication information sent from the network device through a carrier in a licensed frequency band.

20. The terminal device according to claim 18, wherein when the instructions are executed, the terminal device is caused to:
receive the second indication information sent from the network device through a carrier in an unlicensed frequency band.

* * * * *